June 21, 1966  A. ARNOTT  3,257,055
OSCILLATING BREAKOFF MECHANISM FOR SEPARATING
SCORED CAN BODIES
Filed Aug. 7, 1964  2 Sheets-Sheet 1

INVENTOR
ALEXANDER ARNOTT (deceased)
ADMINISTERED BY
DINAH ARNOTT (Executrix)

BY
Mason, Porter, Diller & Stewart
ATTORNEYS

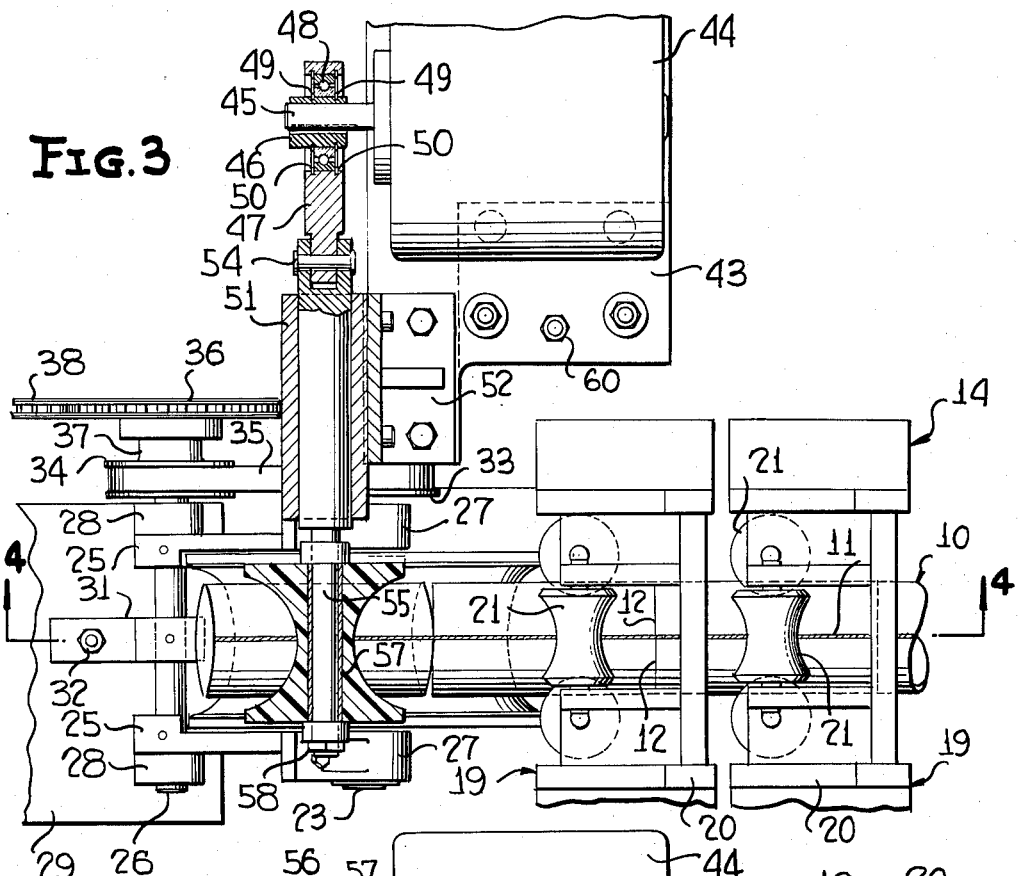
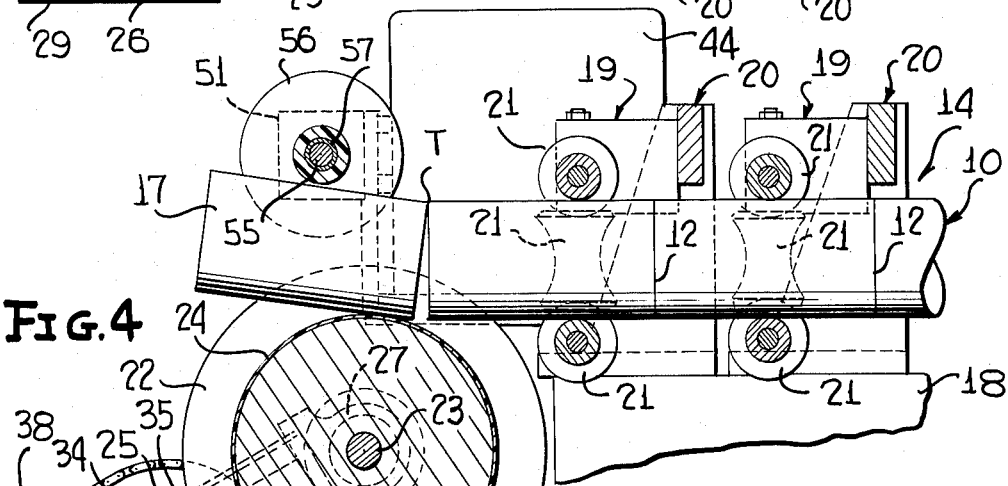

United States Patent Office 3,257,055
Patented June 21, 1966

3,257,055
OSCILLATING BREAKOFF MECHANISM FOR SEPARATING SCORED CAN BODIES
Alexander Arnott, deceased, late of Blue Island, Ill., by Dinah Arnott, executrix, Blue Island, Ill., assignor to Continental Can Company, Inc., New York, N.Y., a corporation of New York
Filed Aug. 7, 1964, Ser. No. 388,328
17 Claims. (Cl. 225—1)

This invention relates in general to apparatus for use in the manufacture of can bodies, and more particularly relates to a novel mechanism for breaking off portions of a continuously formed tube with a welded seam at can body intervals.

Attempts to manufacture can bodies and other tubular elements on a continuous basis by shaping a tube from a strip and forming a continuously welded seam have run into difficulties in that although the tube may be formed at a very rapid rate, the tube cannot be separated into individual tubular elements or can bodies at the same rate.

Accordingly, it is the primary object of this invention to provide a simple device which may be associated with a tube welding apparatus for receiving a continuously welded tube therefrom and for separating the tube into individual predetermined lengths.

Another object of this invention is to provide an apparatus for receiving a prescored tube having a welded seam on a continuous basis and first breaking a leading portion of the tube along the score line defining the same to leave the leading portion connected to the remainder of the tube only by a tab extending along the welded seam, and then parting the tab by twisting the leading portion back and forth about the tab to separate the leading portion from the remainder of the tube.

A further object of this invention is to provide a novel device for receiving on a continuous basis a tube having a welded seam and which has been pre-scored at intervals, the device separating indiscriminately with respect to the movement of the tube and serving to first break each leading portion of the tube along the score line defining the leading portion to partially separate the leading portion from the remainder of the tube and leaving the leading portion connected to the remainder of the tube by a tab disposed along the seam and then twisting the leading portion back and forth about the tab to part the tab and complete the separation of the leading portion from the remainder of the tube.

Another object of this invention is to provide a device for continuously receiving a thin wall sheet metal tube having been pre-scored at intervals and having a welded seam, the device including guide means for receiving the welded tube and controlling the movement thereof along a predetermined path, means for engaging the leading portion of the tube opposite the seam thereof and diverting the leading portion of the tube from the path of movement thereof to tension the tube and effect the breaking thereof along the score line setting off the leading portion, and other means acting transversely to the line of reaction of the tube against the tube diverting means to effect a twisting of the partially broken off leading portion about the remaining tab to effect a parting of the tab and a complete separation of the leading portion of the tube from the remainder of the tube.

A further object of this invention is to provide a novel device for receiving from a tube welding apparatus a thin wall sheet metal tube having pre-formed score lines and a welded seam, the device including a plurality of rolls arranged to guide the tube in a straight line, a tube tensioning roll for engaging a leading portion of the tube remote from and in opposing relation to the seam of the tube to deflect the leading portion of the tube from its path of travel determined by the plurality of rolls whereby the tube is tensioned remote from the seam and is progressively broken along the score line defining the leading portion of the tube to leave a connecting tab between the leading portion of the tube and the remainder of the tube along the welded seam, and a further roll overlying the tube diverting roll and being mounted for reciprocatory movement transversely of the direction of movement of the tube to effect a twisting of the leading portion about the tab to part the tab and complete the separation of the leading portion of the tube from the remainder of the tube.

Still another object of this invention is to provide a novel method of breaking tubular elements from a continuously welded and continuously moving thin wall sheet metal tube having been pre-scored at intervals and having a welded seam, the method including the steps of guiding the tube along a straight path, deflecting a leading portion of the tube from the normal path of the tube to tension the tube remote from the seam thereof and effect a breaking or tearing of the tube along the score line setting off the leading portion to leave a tab extending along the welded seam connecting the leading portion to the remainder of the tube, and then twisting the leading portion transversely of the tube and about the tab to part he tab and complete the separation of the leading portion from the remainder of the tube.

With the above and other objects in view that will hereinafter appear, the nature of the invention will be more clearly understood by reference to the following detailed description, the appended claims and the several views illustrated in the accompanying drawings.

In the drawings:

FIGURE 3 is a plan view of the breakoff device with portions thereof being shown in section along the line 3—3 of FIGURE 2, and shows more completely the details of the breakoff device.

FIGURE 4 is a longitudinal vertical sectional view taken along the line 4—4 of FIGURE 3, and shows the relationship of can body portions of the tube in the process of being broken from the tube.

Figure 1:
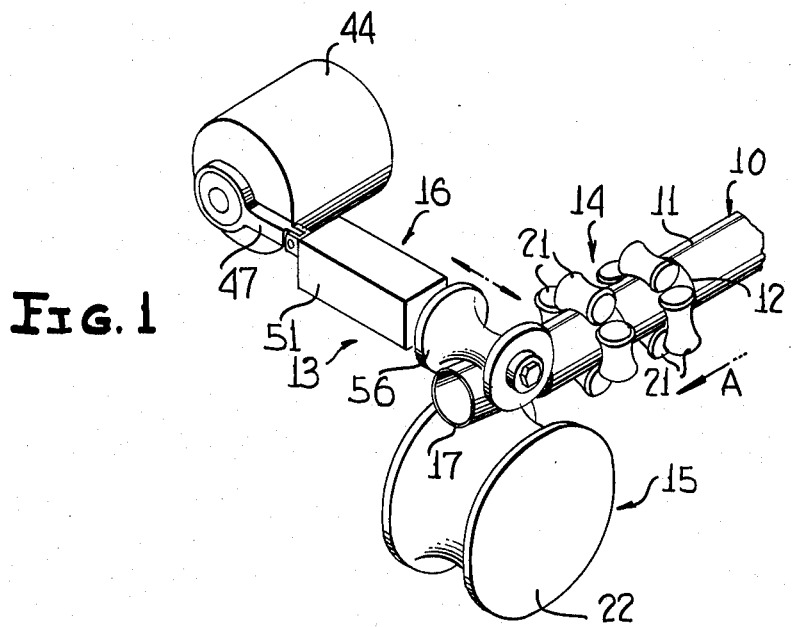
FIGURE 1 is a schematic perspective view showing generally the details of the breakoff device.
Figure 2:
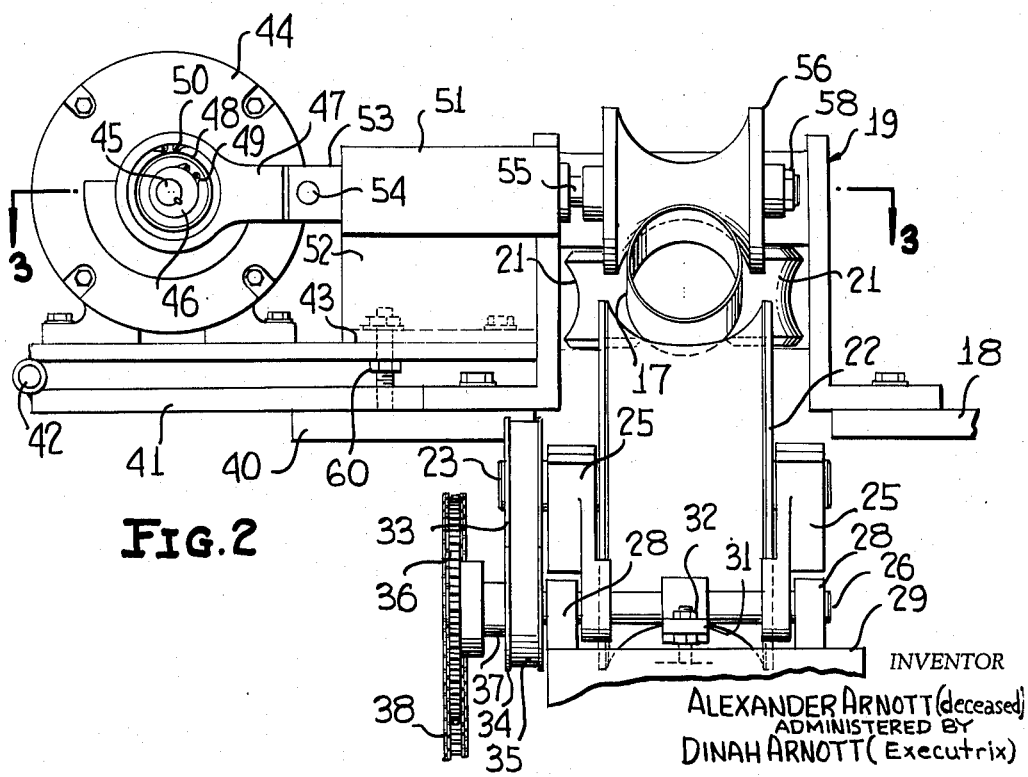
FIGURE 2 is a front elevational view of the breakoff device and shows in more detail the construction thereof.

Referring now to the drawings in detail, reference is first made to FIGURE 1 wherein there is illustrated a tube 10 on which the device of this invention is utilized. The tube 10 is formed on a continuous basis by a shaping and welding operation from a thin sheet metal strip in a manner which is not a part of this invention. As far as this invention is concerned, the tube 10 is cotinuously moving in the direction of the arrow A at a high rate and is provided with a longitudinal welded seam 11 which is normally disposed uppermost, but not necessarily so and the invention is not restricted to this specific position of the seam 11 although the breakoff device must be oriented with respect to the seam 11.

The tube 10 is pre-formed with a plurality of score lines 12 so as to separate the tube 10 into individual predetermined lengths. The score lines 12 extend substantially to the welded seam 11 and are preferably the deepest remote from the seam 11. In the illustrated embodiment of the invention, the tube 10 is of a wall thickness and diameter for forming can bodies, and the score lines 12 are disposed at intervals corresponding to can body lengths.

The breakoff device, which is the subject of this invention, is generally referred to by the numeral 13, and includes three basic components. These components include guide means, generally referred to by the numeral 14, tube tensioning means, generally referred to by the numeral 15, and tube twisting means, generally referred to by the numeral 16.

In accordance with this invention, the guide means 14 support the moving tube 10 in a manner wherein the movement thereof is limited to axial movement. As the leading portion of the tube 10 engages the tube tensioning means 15, the tube leading portion, which is referred to by the numeral 17 in FIGURE 1, is moved out of alignment with the remainder of the tube 10 generally towards the welded seam 11 so as to tension the tube 10 remote from the welded seam 11 at the weakest point of the tube along the closest score line 12 so that there is a rupture of the tube along this score line with the result that the leading portion of the tube is broken from the remainder of the tube along the score line 12 with the exception of a connecting tab T, which is best shown in FIGURE 4. As the tube leading portion 17 is moved upwardly by the tube tensioning means 15, it is engaged by the tube twisting means 16 and reciprocated transversely of the direction of movement of the tube 10 to twist the tube leading portion 17 about the tab T connecting the leading portion of the tube to the remainder of the tube. This twisting action is rapid and results in the parting of the tab T to completely separate the tube leading portion 17 from the remainder of the tube 10.

Referring now to the structural details of the breakoff device 13, it will be seen that the guide means 14 are mounted on a suitable support 18 and include at least two collar roll units 19. Each collar roll unit 19 includes a suitable supporting bracket assembly 20 which supports for freedom of rotation four collar rolls 21 which are arranged in a rectilinear pattern. The axes of two of the collar rolls 21 of each set are disposed parallel to a plane passing through the welded seam 11 and the axis of the tube 10, while the axes of the other two collar rolls 21 of each set are disposed perpendicular to that plane. The collar rolls 21 are generally hourglass in outline, as is clearly shown in FIGURE 3.

It will be readily apparent that since the collar rolls 21 snugly engage the tube 10 and since the two sets of collar rolls are in alignment, the two sets of collar rolls serve to define a straight line path for the tube 10 and prevent the deflection of the tube 10 from that straight line path.

The tube tensioning means 15 includes a large diameter support roll 22 which has a shaft 23 extending normal to the plane passing through the welded seam 11 and the axis of the tube 10, the shaft 23 being parallel to the axes of two of the collar rolls 21 of each set of collar rolls. The support roll 22 is preferably provided with a rubber covering 24 or like resilient covering to prevent damage to tube leading portions 17 coming into contact therewith.

The shaft 23 of the support roll 22 is carried by a pair of support arms 25 which are secured to a shaft 26 for pivotal movement therewith, the shaft 26 being parallel to the shaft 23. The support arms 25 are fixed to the shaft 26 and carry at their ends remote from the shaft 26 bearing units 27 in which the shaft 23 is rotatably journalled.

The shaft 26 is journalled in a pair of journal blocks 28 which extend upwardly from a support 29 which includes an upper plate 30. The shaft 26 also has secured thereto an arm 31 which is disposed intermediate the support arms 25 and which is adjustably positioned with respect to the plate 30 by means of an adjusting screw unit 32. The adjusting screw unit 32 permits the support roll 22 to be adjusted relative to the axis of the tube 10 so that the support roll 22 may be positioned to apply the necessary pressure on the tube leading portion 17 to force the same towards the welded seam 11 whereby that portion of the tube remote from the welded seam 11 is sufficiently tensioned to effect a tearing or breaking thereof along the next adjacent score line 12.

In accordance with this invention, the support roll 22 is driven and has a peripheral speed corresponding generally to that of the speed of movement of the tube 10. The driving of the support roll 22 is accomplished through the shaft 23 to which there is connected a pulley 33. The pulley 33 is driven from a pulley 34 by means of a belt 35. The pulley 34 is rotatably journalled on the shaft 26 and is connected to a sprocket 36 by means of a connecting hub 37. The sprocket 36 is driven in any conventional manner by means of a chain 38 to provide for the proper driving speed of the support roll 22.

The tube twisting means 16 is carried by a plate 40 which is part of the support 18 and includes a horizontally disposed plate 41 which is provided at an end thereof remote from the path of movement of the tube 10 with a hinge 42 having an axis disposed parallel to the axis of the tube 10. The hinge 42 supports for pivotal movement a plate 43 which overlies the plate 41. An electric motor 44 is fixed to the plate 43 and has an armature shaft 45 on which there is keyed an eccentric 46. The eccentric 46 carries a crank arm 47 by means of a bearing 48 which is held on the eccentric 46 by a snap ring 49 and which is held in the crank arm 47 by means of a snap ring 50.

The tube twisting means 16 also includes an elongated guide 51 which is mounted above the plate 43 by means of a bracket 52. The guide 51 carries for reciprocatory movement therethrough a connecting rod 53 which is connected to the crank arm 47 for pivotal movement by a pivot pin 54.

The end of the connecting rod 53 remote from the crank arm 47 is in the form of a shaft 55 on which there is journalled a tube twisting roll 56. The roll 56 is preferably formed of a suitable soft material, such as phenolic, to prevent scratching and otherwise damaging of the portions of the tube during contact therewith. The roll 56 is provided with a bushing 57 which is rotatably journalled on the shaft 55 and is retained on the shaft 55 by means of a nut 58.

It is to be noted that an adjusting screw device 60 extends between the plates 41 and 43 so as to permit the vertical adjustment of the roll 56. It is to be understood that when the adjusting screw device 60 is utilized, the plate 43 will pivot relative to the plate 41 by means of the hinge 42.

Referring now to FIGURE 4 in particular, it will be seen that if it were not for the support roll 22, the tube 10 would pass beneath the roll 56 and not come into engagement therewith. It is not until the tube leading portion 17 is broken along its corresponding score line 12 and pivoted about the welded seam 11 as a hinge that the tube leading portion 17 comes into contact with the roll 56.

The support roll 22 is adjusted towards the seam of the tube 10 so as to apply a sufficient pressure on the tube leading portion 17 to place the tube 10 under tension as required to rupture the tube 10 along the score line 12. The position of the roll 56 with respect to the roll 22 is adjusted so that the tube leading portion 17 does not come under the influence of the reciprocating roll 56 until such time as the tube leading portion 17 has been substantially broken away from the tube 10 with the exception of the tab T. Then as the tube leading portion 17 comes under the influence of the rapidly reciprocating roll 56, it is rapidly twisted about the tab T to effect the necessary parting of the tab T, at which time the tube leading portion 17 becomes completely separated from the remainder of the tube 10 and is moved forwardly by the roll 22.

It will be readily apparent that the rolls 22 and 56 are so constructed wherein they do not unduly scratch or otherwise damage the portions of the tube 10 broken off thereby even though the tube 10 may be formed of very thin gauge sheet metal which may be tin plated. Furthermore, it will be readily apparent that the functioning of the breakoff device 13 is without reference to the speed of movement of the tube 10 with the exception that the support roll 22 should be driven at approximately the same peripheral speed as the tube 10. There is no synchronization between the reciprocating roll 56 and the positioning of a tube leading portion in engagement therewith and the breakoff device 13 operates indiscriminately of the feeding of the tube thereinto.

Although only a preferred embodiment of the invention has been specifically illustrated and described here, it is to be understood that minor modifications may be made therein within the spirit and scope of the invention, as defined in the appended claims.

I claim:

1. A breakoff device for breaking off individual lengths of pre-scored welded-seam tube, said device comprising guide means for guiding a tube in an axial direction along a predetermined path, means for shifting a leading portion of the tube to an angular position relative to the tube axis to break the leading portion of the tube from the remainder of the tube along a score line defining the leading portion except for a tab along the welded seam, and means for twisting the tube leading portion back and forth about the tab after breaking of the tube to part the tab and complete the separation of the tube leading portion from the remainder of the tube.

2. A breakoff device for breaking off individual lengths of pre-scored welded-seam tube, said device comprising guide means for guiding a tube in an axial direction along a predetermined path, a tube tensioning member having a tube engaging surface axially aligned with said guide means in a plane through said member generally normal to the tube engaging surface and being offset towards the axis of the tube path, said member being disposed remote from the path of the tube seam whereby as the tube passes over said member said member reacts against the tube to divert the leading portion of the tube from its path and to tension the tube remote from the tube seam to progressively break the tube along a score line thereof defining a leading portion of the tube to a point wherein the tube leading portion is connected to the remainder of the tube by a tab along the tube seam, and means for twisting the tube leading portion back and forth about the tab after breaking of the tube to part the tab and complete the separation of the tube leading portion from the remainder of the tube.

3. The breakoff device of claim 2 wherein said twisting means are disposed downstream of said shifting means whereby the tube leading portion is engaged with said twisting means only after deflection of the tube leading portion by said shifting means.

4. A breakoff device for breaking off individual lengths of pre-scored welded seam tube, said device comprising guide means for guiding a tube in an axial direction along a predetermined path, a tube tensioning member having a tube engaging surface axially aligned with said guide means in a plane through said member generally normal to the tube engaging surface and being offset towards the axis of the tube path, said member being disposed remote from the path of the tube seam whereby as the tube passes over said member said member reacts against the tube to divert the leading portion of the tube from its path and to tension the tube remote from the tube seam to progressively break the tube along a score line thereof defining a leading portion of the tube to a point wherein the tube leading portion is connected to the remainder of the tube by a tab along the tube seam, a tube leading portion twisting member mounted generally in opposed relation to said tube tensioning member, and means mounting twisting member for reciprocal movement generally normal to said plane for twisting the tube leading portion back and forth about the tab after the breaking of the tube to part the tab and complete the separation of the tube leading portion from the remainder of the tube.

5. The breakoff device of claim 4 wherein said twisting member is disposed downstream of said tube tensioning member whereby said twisting member is engaged by a tube leading portion only after deflection thereof by said tube tensioning member.

6. A breakoff device for breaking off individual lengths of pre-scored welded-seam tube, said device comprising guide means for guiding a tube in an axial direction along a predetermined path, a tube tensioning roll axially aligned with said guide means in a plane passing through the axis of the tube path and through the tube seam path, said tensioning roll having a tube engaging surface offset from the tube path towards the tube seam path whereby as the tube passes over said tensioning roll said tensioning roll reacts against the tube to divert the leading portion of the tube from its path and to tension the tube remote from the tube seam to progressively break the tube along a score line thereof defining a leading portion of the tube to a point wherein the tube leading portion is connected to the remainder of the tube by a tab along the tube seam, and means for twisting the tube leading portion back and forth about the tab after breaking of the tube to part the tab and complete the separation of the tube leading portion from the remainder of the tube.

7. A breakoff device for breaking off individual lengths of pre-scored welded-seam tube, said device comprising guide means for guiding a tube in an axial direction along a predetermined path, a tube tensioning roll axially aligned with said guide means in a plane passing through the axis of the tube path and through the tube seam path, said tensioning roll having a tube engaging surface offset from the tube path towards the tube seam path whereby as the tube passes over said tensioning roll reacts against the tube to divert the leading portion of the tube from its path and to tension the tube remote from the tube seam to progressively break the tube along a score line thereof defining a leading portion of the tube to a point wherein the tube leading portion is connected to the remainder of the tube by a tab along the tube seam, a tube leading portion twisting roll generally overlying said tube tensioning roll, and means for supporting and reciprocating said twisting roll along its axis and transversely of the tube path for twisting a tube leading portion about the tab thereof to part the tab and completely separate the tube leading portion from the remainder of the tube.

8. The breakoff device of claim 7 wherein said tube tensioning roll is driven at substantially the same peripheral speed as the intended tube speed.

9. The breakoff device of claim 7 wherein the reciprocation of said twisting roll is independent of tube speed.

10. The breakoff device of claim 7 wherein said tube tensioning roll is driven at substantially the same peripheral speed as the intended tube speed and the reciprocation of said twisting roll is independent of tube speed.

11. The breakoff device of claim 7 wherein said twisting roll has an axis disposed downstream of an axis of said tensioning roll.

12. The breakoff device of claim 7 wherein said twisting roll is spaced from said tensioning roll a distance in excess of the internal clearance of said guide means whereby a tube leading portion engages said twisting roll only after being deflected and partially broken by said tensioning roll.

13. The break of device of claim 7 wherein said twisting roll is spaced from said tensioning roll a distance in excess of the internal clearance of said guide means whereby a tube leading portion engages said twisting roll only after being deflected and partially broken by said tensioning roll, said twisting roll having an axis disposed downstream of an axis of said tensioning roll.

14. The breakoff device of claim 7 wherein said rolls have soft tube engaging surfaces to restrict tube damage.

15. The breakoff device of claim 7 wherein said guide means includes at least two longitudinally spaced sets of tube positioning rolls.

16. A method of breaking a tube having a longitudinal welded seam and prescored at longitudinal intervals into individual tubular elements, the method comprising the steps of guiding and moving the tube longitudinally of its axis, engaging a leading portion of the tube at a point remote from and generally opposite to the seam and deflecting the leading portion of the tube to tension the tube remote from the seam and progressively breaking the tube along an adjacent one of the score lines with the tube leading portion hinging about the welded seam and remaining connected to the remainder of the tube by a tab disposed along the welded seam, and then twisting the tube leading portion about the seam to part the tab and complete the separation of the tube leading portion from the remainder of the tube.

17. A method of breaking a tube having a longitudinal welded seam and pre-scored at longitudinal intervals into individual tubular elements, the method comprising the steps of guiding and moving the tube longitudinally of its axis, engaging a leading portion of the tube at a point remote from and generally opposite to the seam and deflecting the leading portion of the tube to tension the tube remote from the seam and progressively breaking the tube along an adjacent one of the score lines with the tube leading portion hinging about the welded seam and remaining connected to the remainder of the tube by a tab disposed along the welded seam, and the twisting the tube leading portion about the seam at right angles to the welded seam.

References Cited by the Examiner

UNITED STATES PATENTS

| | | | |
|---|---|---|---|
| 2,060,561 | 11/1936 | Fausset | 225—98 X |
| 2,444,463 | 7/1948 | Nordquist | 219—64 X |
| 3,124,872 | 3/1964 | Knodel | 29—413 |

WILLIAM W. DYER, JR., *Primary Examiner.*

J. M. MEISTER, *Assistant Examiner.*